A. P. MINNICK.
CHURNS

No. 195,224.  Patented Sept. 18, 1877.

Witnesses.
G. W. Forel
E. A. Hale

Inventor.
Alexander P. Minnick

UNITED STATES PATENT OFFICE.

ALEXANDER P. MINNICK, OF ROCKFORD, ILLINOIS, ASSIGNOR OF ONE-HALF HIS RIGHT TO JOHN C. CHAPPELL, OF SAME PLACE.

IMPROVEMENT IN CHURNS.

Specification forming part of Letters Patent No. 195,224, dated September 18, 1877; application filed September 22, 1876.

*To all whom it may concern:*

Be it known that I, ALEXANDER P. MINNICK, of Rockford, in the county of Winnebago and State of Illinois, have invented a new and useful Improvement in Revolving Churns; and I do hereby declare that the following is a full and exact description of the same, reference being had to the accompanying drawings, and to the letters of reference marked thereon.

Figure 1:
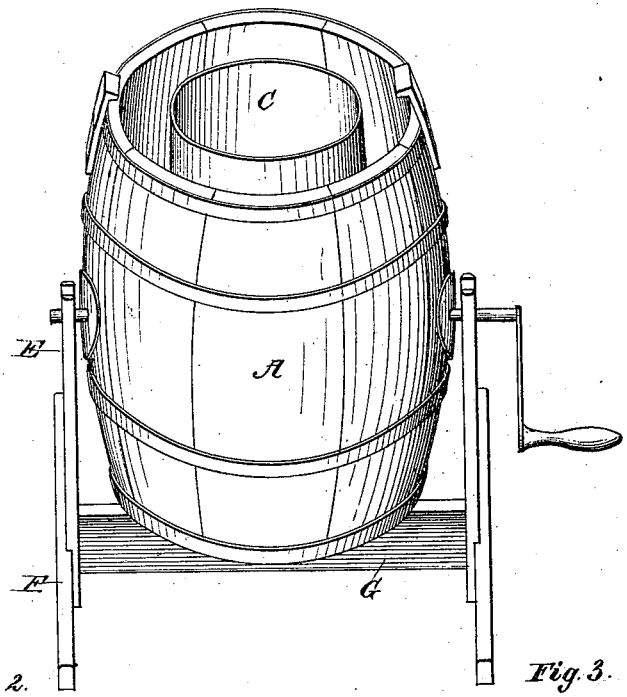
Figure 2:
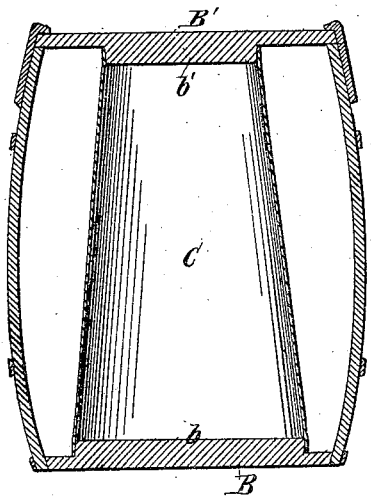
Figure 3:
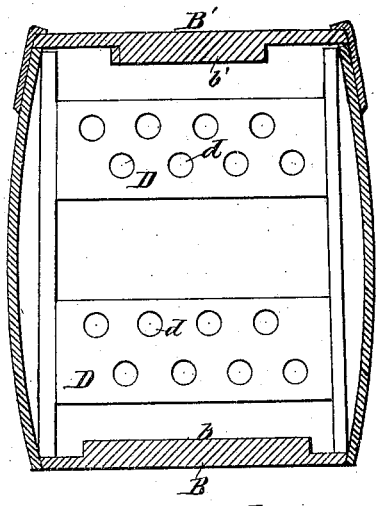

Figure 1 is a perspective view of the churn, showing (by having the head removed) the cream-cylinder in position. Fig. 2 is a sectional view, taken through the longitudinal center of the body, showing the cylinder and manner of securing the same to the heads of the churn. Fig. 3 is a longitudinal sectional view of the churn-body, showing the cream-breaker in position.

Similar letters of reference denote corresponding parts in all the figures.

The object of the invention is to provide an end-over-end revolving churn with an inner receptacle by which the cream may be tempered by being surrounded, or partially surrounded, by water, and yet so constructed that the said inner receptacle may be easily removed and be replaced by a cream-breaker, and by means of which the churning is more speedily finished; and consists of a barrel-shaped body, mounted upon journals located upon the outside of the barrel near the center, so as to give an end-over-end revolution, and having within the said body an open-end cylinder, the ends of which enter the heads of the body, preferably made tapering in form, to facilitate the removal of the said cylinder from the cream when the same shall become thickened by the churning process, as will be hereinafter explained.

It further consists of a removable rectangular-shaped frame having perforations in the cross-bars, through which the cream passes, which serve to break the cream as the body is revolved.

This breaker is only used after the removal of the cylinder, the operation of which will be hereinafter explained.

In the drawings, A represents the body, B the bottom, and B' the top or cover. $b$ is the raised portion of the bottom, and $b'$ the raised portion of the top or cover, each of which fit tightly within the ends of the cylinder or cream-receptacle.

C represents the cylinder, within which the cream to be churned is placed. For the purpose of easy removal this cylinder is made tapering in form; but the same may be made with the ends of equal diameter, if desired, and not depart from the spirit of the invention.

D is the cream-breaker, having holes $d$ through the same. This breaker may, if desired, be made with plain narrow cross-slats, instead of the wide perforated ones shown, and is to be placed within the churn-body after the cylinder has been removed, as will be hereinafter explained.

E are the upright posts upon which the churn is mounted. F are the cross-beams or foot-supports of the same. G is a cross-tie placed between the upright posts for the purpose of keeping the same in a perpendicular position.

The cover may be packed with leather, rubber, or other suitable material, where the part comes in contact with the shell of the body, and may be secured to the shell, as may be desired, as I do not claim anything in this application upon the manner of securing the said cover.

The operation is as follows: When to be used the cylinder is set in the bottom over the raised circular part, which fits tightly within the same, so as to be water-tight. The cream is then poured into this cylinder, and the space between the cylinder and churn-body is filled, or partially filled, with cold water when the cream is to be cooled, or with warm water when the cream is to be warmed. The cover is placed upon the body, with the raised circular part within the top end of the cylinder, and secured in a tight manner, and the whole is made to revolve by a crank attached to the body, as shown, or the same may be made to revolve end-over-end by any other method.

This revolving process is continued until the cream within the cylinder begins to thicken, or until it is of the right temperature, when the water is drawn off, the cylinder is removed, thus letting the cream take the place of the water, the cream-breaker placed inside in the place of the cylinder, when the revolving is again commenced. By revolving the churn with the breaker inside, the cream will be forced through the holes in the said breaker, which causes the butter to speedily separate from the milk, and when done the breaker is removed and the butter gathered by a further revolution, all of which will be understood without further description.

Having now described my invention, what I claim as new, and desire to secure by Letters Patent, is—

In an end-over-end revolving barrel-churn, the longitudinal removable open-end cream-cylinder, arranged and operating substantially as described, and for the purpose set forth.

This specification signed and witnessed this 2d day of September, 1876.

ALEXANDER P. MINNICK.

Witnesses:
G. W. FORD,
E. A. HALE.